Sept. 23, 1969 R. G. ADAMSON ET AL 3,468,201

DIGITALIZED PRINT-TO-CUTOFF REGISTER SYSTEM

Filed March 9, 1967 2 Sheets-Sheet 1

Inventors
ROBERT G. ADAMSON
PAUL W. THIEDE

By Silverman + Cass

Attys.

DIGITALIZED PRINT-TO-CUTOFF REGISTER SYSTEM

Filed March 9, 1967 2 Sheets-Sheet 2

Inventors
ROBERT G. ADAMSON
PAUL W. THIEDE
By Silverman + Cass
Attys.

United States Patent Office 3,468,201
Patented Sept. 23, 1969

3,468,201

DIGITALIZED PRINT-TO-CUTOFF REGISTER SYSTEM

Robert G. Adamson and Paul W. Thiede, Danville, Ill., assignors to Hurletron Incorporated, Danville, Ill., a corporation of Delaware Filed Mar. 9, 1967, Ser. No. 621,943
Int. Cl. B26d *5/00;* B65h *23/18*
U.S. Cl. 83—74 16 Claims

ABSTRACT OF THE DISCLOSURE

Apparatus for measuring the distance between a first and second point on a moving media by measuring a smaller distance between the second of these points and an intermediate point, comprising: a presettable encoder of a digitalized train of pulses which measures the optimal value of the smaller distance, a scanner which notes the actual position of the second point, digitalized and polarized comparator circuitry which calculates the relative positions of the optimal and actual second points, and a bidirectionally digitalized meter coupled to the comparator circuit.

This invention relates generally to a registration monitor apparatus for printing presses and, more particularly, is directed to a digitalized and especially precise register system which monitors the distance between the start of printing and cutoff positions of a rapidly moving web which is being cut into small preprinted card stock.

Although this invention is capable of being employed in conjunction with many types of web transporting machines which perform consecutive operations upon the web, these operations requiring close tolerance registration, the specific embodiment will be described in a printing and cutoff environment in which the web, after being printed, is cut into data cards.

Advancing technology has provided increased horizons for the use of data cards having rows and columns of discrete pads which can be selectively encoded and later decoded by automated processes. As a result of the increased sophistication of these data encoding and decoding processes, the data card has also become more sophisticated and its specifications more exacting. The data card employed as the workpiece herein is formed from a continuous web which is printed with a central body of rows and columns of pads such that the printed pads are of different light transmitting capability than the immediately adjacent web stock. It is essential that the columns of pads be precisely positioned with respect to the ends of the card.

Additionally, it is essential that cutoff to print misregistration be immediately recorded and precisely corrected to avoid web waste; while, at the same time, tne apparatus be of a type controllable by a relatively unskilled human operator. To gain these ends, the present invention is digitalized both in its internal electronics as well as its visual output, which provides easy detection of registration deviation less than two thousandths of an inch, as well as digitalized visual observation of the correction of such deviation.

To be sure, the prior web feeding and printing arts contain registration systems providing high accuracy; however, commercial registration apparatus combining the high accuracy, moderately high speed, low cost, structural simplicity, ease of operation, and above all, a digitalized input-output as provided by this invention, have not heretofore been available.

Accordingly, it is a primary object of the invention to provide an improved, especially precise, print-to-cutoff registration system.

Another object of the invention is to provide an easily operable web registration system having digitalized input-output capabilities.

To accomplish these objects, the invention compares the position of the first column of data pads on each preprinted data card with an arbitrary position of a reference point as the web advances to the cutting station. The comparison is monitored on a digitalized distance base which measures the deviation from standard registration and provides a visual readout measured in mil-inches of error.

Other objects and features of the invention will become apparent to those skilled in the art from the following description taken in connection with a preferred embodiment illustrated in the accompanying drawings in which.

Figure 1:
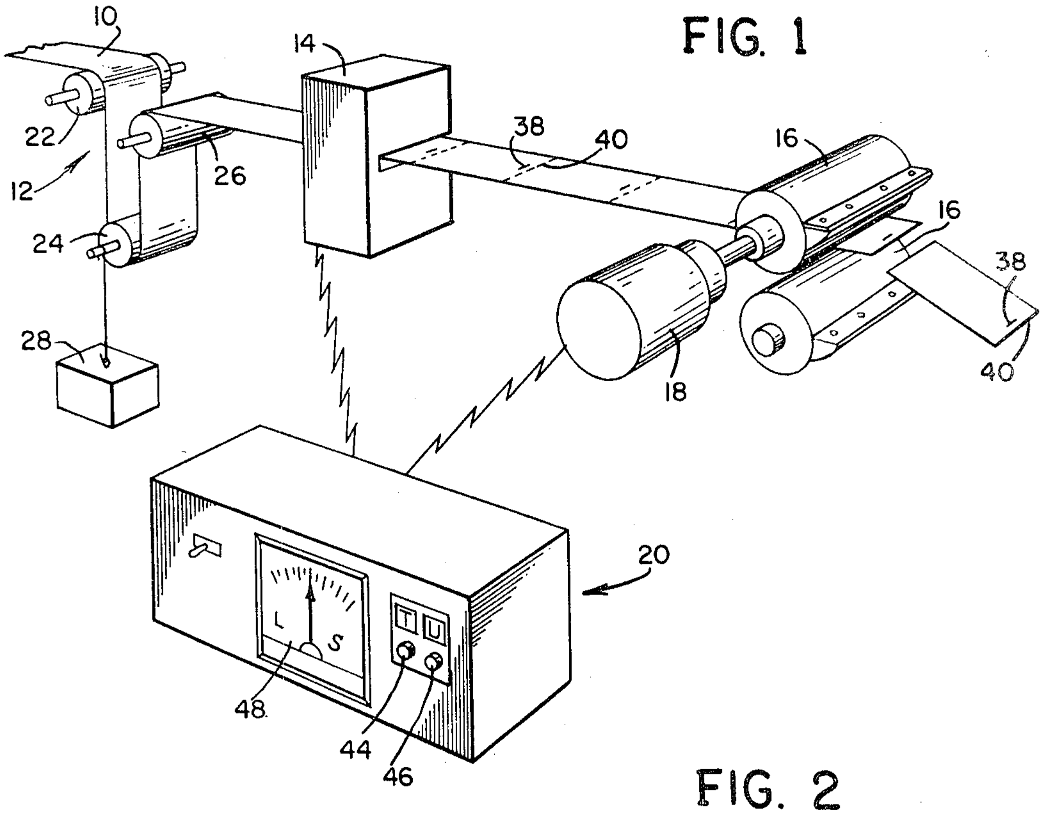
FIG. 1 is a diagrammatic view of the invention and includes a web loop control through whch the physical registration of the web can be adjusted.

Referring first to FIG. 1, there is shown the continuously driven web 10 as it passes, from left to right, a conventional web loop registration adjustor 12, an optical scanner 14, and a pair of web cutting cylinders 16. Axially affixed to one of the cutting cylinders and operated in response to rotation of the cylinder is a cylinder position monitor 18. Both the scanner 14 and the cylinder position monitor 18 are electrically coupled to a digitalized registration computer 20.

Although web position adjustors can be of numerous types, and therefore the illustrated adjustor 12 is not to be considered a limitation upon the invention, even the illustrated simple adjustor can provide excellent registration control when employed with the present invention. As well known, the web adjustor can provide excellent registration control when employed with the present invention. As well known, the web 10 passes around rollers 22, 24, and 26 forming a loop which has a variable length which is dictated by the position of the roller 24 which is vertically shifted through a controller 28 to either advance or retract the relative position of the moving web with respect to the cutting cylinders 16. In its simplest form, the controller 28 is operator manipulated by a hand control knob, not shown. More complex servo systems are also available. Though not specifically detailed hereinafter, it will be appreciated that the resultant signals from the computer 20 could, in addition to providing a digitalized visual readout, also be fed into the controller 28 for automatic operation thereof.

Figure 2:
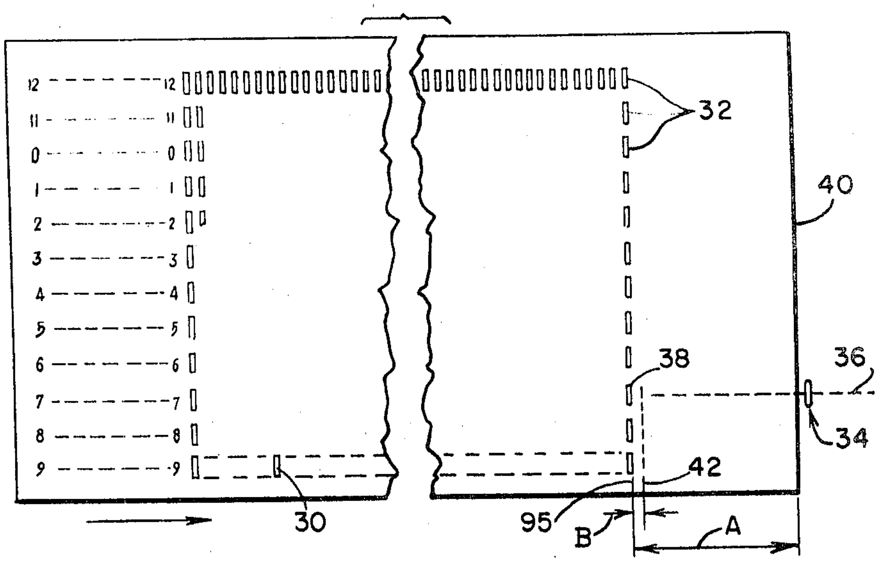
FIG. 2 is a top plan view of a data card, diagrammatically illustrating related monitoring portions.

Prior to passing the scanner 14, the web 10 is printed, for example as shown in FIGS. 1 and 2, with a repeated pattern, such as a data card having a plurality of rows of data pads 30 and a far greater number of columns of such pads. Inasmuch as the web is moving to the right in the figures the column 32 of pads farthest to the right will be termed the first column, since it first reaches the scanner 14, notwithstanding the fact that for data processing purposes the column 32 usually carries the highest position designation.

As previously stated, the pads 30 are printed such that they have different light transmitting characteristics from the unprinted portions of the web. Hence scanning by conventional optical apparatus is easily accomplished by the scanner 14. As shown in FIG. 2, the scanner examines an area 34 generally similar to the size and shape of one of the pads. Movement of the printed web 10 through the scanner 14 creates a scanning track 36, which bisects a chosen row of the pads. At the intersection of the chosen row and the first column of pads lies a single significant pad, hereinafter termed the measuring pad 38. The distance A between the leading edge of the measuring pad 38 and the leading or right edge 40 of the data card is the critical print-to-cutoff measurement that the invention is designed to monitor.

Rather than actually measure the entire distance A, an arbitrary and far smaller controlled distance B is established between the leading edge of the measuring pad 38 and a zero reference position 42. The zero reference position is derived from the cylinder position monitor 18 and represents a digitalized value presettable by the computer 20 via a pair of control knobs 44 and 46. These knobs are designated on the computer chassis as T for tens and U for units of digitalized encoder pulses which are employed to obtain a mode of operation explained hereinafter.

A zero centered meter 48 is also carried on the computer chassis. Each division of the meter scale represents 1.5 mil-inches, which is the nominal range of accuracy of the embodied invention when employed in the production of typical data cards having a repeat length of 7.375 inches. In this specific case, the print-to-cut off distance A is 1.12 inches +.002 inches. Also, the controlled distance B is nominally preset at 0.75 inch.

The cylinder position monitor 18 comprises a pulse generator, or encoder, which produces a fixed number of signals, such as 5,000, during each revolution of the cutting cylinders 16. In this manner, each signal represents a specific length of the web passing between the cutting cylinders. Under nominal conditions one pulse signal represents 1.5 mils of the web, which as stated, is the same as the scaling on the meter 48.

The cylinder position monitor also contains means for producing a zero position reference pulse once each revolution of the cutting cylinders; i.e., once for each 5,000 of the encoder pulses. In FIG. 2, the zero reference position 42 designates the time-position occurrence of the zero reference pulse. Hence, the controlled distance B, nominally 75 mils, equals a span of 50 encoder pulses and places the leading edge of the measuring pad 38 at 50 encoder pulses after the zero reference pulse.

Though not illustrated, the cylinder position monitor 18 is provided with manual adjustment means which enable the physical presetting of the circumferential position of the monitor with a fixed hair line which indicates the generating position of the zero reference pulse. The use of such adjustment means in combination with the control switches 44 and 46 will be detailed subsequently.

Figure 3:
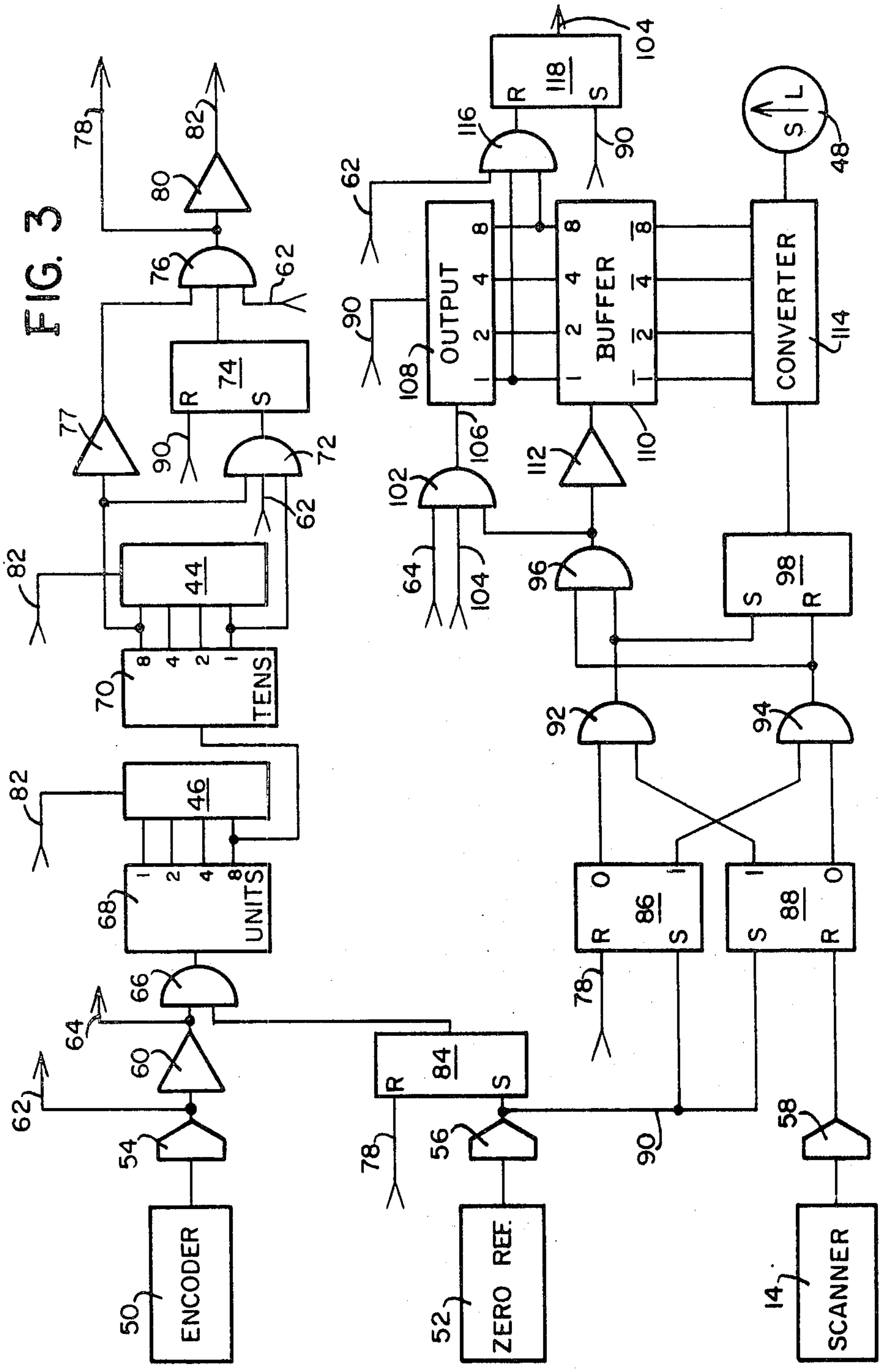
FIG. 3 is a block diagram of the electrical circuitry of the invention.

Referring next to FIG. 3, there is shown in conventional block diagram symbols the circuitry of the invention. An encoder block 50 represents the structure within the cylinder position monitor 18 which generates the 5,000 encoder pulses per revolution of the cutting cylinders. A zero reference block 52 represents the structure also within the monitor 18 which generates the zero reference pulse once each revolution of the cutting cylinders. The scanner 14 is represented by a logic block of the same number. Similarly, the meter 48 carries the same reference as in FIG. 1.

The electronic circuitry next to be described operates in the negative logic mode in which a high signal is of positive voltage, such as plus three volts, and a low signal is approximately at ground. In this mode, if any input to a gate is high, its output is low. However, if all inputs of the gate are low, the output is high. The bistable or flip flop devices are actuated by high inputs which generate low "affirmative" outputs. Hence, in a four terminal bistable device, a high signal to the set input causes the "1" output to go low and the "0" output to go high.

The circuitry further contains typical decade counters which operate in the binary mode, also in negative logic, as shown in the following table in which the decimal output is formed by the sum of the binary stages having an L signal in the associated row in which the signal type is H for high and L for low:

| | 1 | 2 | 4 | 8 |
|---|---|---|---|---|
| 0 | H | H | H | H |
| 1 | L | H | H | H |
| 2 | H | L | H | H |
| 3 | L | L | H | H |
| 4 | H | H | L | H |
| 5 | L | H | L | H |
| 6 | H | L | L | H |
| 7 | L | L | L | H |
| 8 | H | H | H | L |
| 9 | L | H | H | L |

Pulse shaping pre-amplifiers 54, 56, and 58 are respectively coupled to the output of each the encoder 50, the zero reference pulse source 52, and the scanner 14. The continuous train of positive rising encoder pulses from the pre-amplifier 54 are coupled to an inverter 60 and a conductor 62; the latter will be reintroduced subsequently. The output from the inverter 60 is applied to a conductor 64 and a gate 66. A decade counter 68, the units counter, is connected to the output of the gate 66. All of the outputs—1, 2, 4 and 8—of the units counter are coupled to be presettable by the units switch 46, which as briefly mentioned previously, is manually set from its position on the front of the chassis of the computer 20. Progressive manipulation of the units switch 46 resets to the H condition each of the outputs of the units counter. In a similar manner, the tens switch 44 is connected to a second decade counter 70 for its presetting.

With continued reference to FIG. 3, the input of the tens counter 70 is coupled to the 8 output of the units counter. As shown on the previous counting table, the 8 line goes high on receipt of the zero or tenth pulse; hence, for each ten pulses from the encoder 50 which also pass through the gate 66, the tens counter 70 is advanced on decade position.

A gate 72 is connected to receive the 1 and 8 outputs from the tens counter as well as the signal on conductor 62 from the pulse pre-amplifier 54. Since the 1 and 8 lines are simultaneously low only during the receipt of the 90th pulse and the line 62 is low upon the trailing edge of each pulse therethrough, the gate 72 goes high only upon the trailing edge of each 90th pulse. A bistable device 74 has its set input S coupled to the output of the gate 72; hence, this device is set and provides a low output upon the trailing edge of the 90th pulse.

A gate 76 receives the only output from the bistable device 74. The conductor 62 forms the second input to this gate, in the shape of a train of pulses. An inverter 77 couples the 8 line from the tens counter 70 to this gate to thereby enable it on the trailing edge of the 100th encoder pulse. Hence, during the controlled distance B, which terminates upon the 100th pulse, this gate remains in the low state. The output of the gate is applied directly to a conductor 78, which forms the ultimate output from the encoder 50. An inverter 80, via conductors 82, coupled the output from the gate 76 back to the reset inputs of the counter switches 44 and 46 to accomplish their preset resetting of their counters 70 and 68 just prior to the measuring of the controlled distance B of each data card or the like.

The circuitry described to this juncture would not have been placed into operation, unless a second input to the gate 66 had been enabled by a low signal. Triggering of a set input S of a bistable device 84, by the zero reference pulse from its source 52 through the associated pre-amplifier 56, passes the needed low signal to the second input of the gate 66 to thereafter allow the train of encoder pulses to actuate the counters 68 and 70 and other related logic.

\A pair of bistable devices 86 and 88 have their set inputs S connected via a conductor 90 to the pre-amplifier 56 so that these devices are set at the beginning of the measurement of the controlled distance B. A pair of gates 92 and 94 each have their two inputs cross connected to outputs of both bistable devices 86 and 88 as shown. In this manner, both gates have one of their inputs held low upon the generation of the zero reference signal, which is applied through the "1" outputs, and both of these gates will be enabled by a resetting of the bistable device having its "0" output connected to the other gate input. These four elements—86, 88, 92 and 94 form the order of occurrence logic which reports the relative position of the measuring pad 38 with respect to the proximate end 95 of the controlled distance B. The ideal condition is for both gates to be enabled simultaneously, thus denoting that the measuring pad 38 is precisely positioned at the end 95 of the controlled distance, and, therefore, the print-to-cutoff distance A is being maintained. The conductor 90 from the zero reference pre-amplifier is also connected to the reset R input of the bistable device 74 to hold it output high until 90th clock pulse. Accordingly, the output from the gate 76 is in the form of a pulse train subsequent to the 100th encoder pulse and prior to the zero reference pulse. Since it is desired that the controlled distance B be equal to fifty encoder pulses and that distance measurement terminates upon the 100th pulse, the zero reference pulse must be enabled on the 50th pulse. This aspect is accomplished by the presetting of the decade counters 68 and 70 by their control switches 46 and 44.

As shown in FIG. 3, the reset input R of the bistable device 86 is coupled through conductor 78 to receive the ultimate, i.e., 100th encoder signal. The R input of the bistable device 88 receives its control signal from the scanner 14 via its pre-amplifier 58. Hence, the system counts the pulses between the scanner signal, which represents the position of the measuring pad 38, and the occurrence of the end of the controlled distance B, as signaled by the 100th clock pulse transmitted via conductor 78.

The remainder of the circuitry of FIG. 3 measures in a digitalized manner the error pulses, converts the digital count to an analogue signal of correct polarity, and applies it to the meter 48. A gate 96 is coupled to receive the output from both of the gates 92 and 94 and thereby passes a low going "registration in error signal" for the duration that either one of the gates 92 or 94 is enabled prior to the enabling of its counterpart. A bistable device 98 has its S and R inputs coupled to the gates 92 and 94 respectively and generates a characteristic signal depending upon which gate, 92 or 94, was enabled first. Specifically, a setting signal from the gate 92 produces a low output from the device 98 which signifies that the 100th encoder pulses preceded the scanner signal, i.e., the reference line 95 is to the right of the pad 38; hence, the print-to-cutoff distance A is too long. In a similar mannr, a resetting signal from the gate 94 generates a high output from the bistable device 98 and states that the measuring pad 38 lies within the controlled distance B; hence, the print-to-cutoff distance A is too short. Thus, the gate 96 measures the magnitude of registration error and the device 98 states the nature of that error.

A gate 102 is connected to receive the error output from the gate 96 as well as the train of encoder pulses via the conductor 64, which is at the output of the inverter 60. A conductor 104, normally low, is also coupled to the gate 102 so that the output of this gate, as seen on a conductor 106, is a train of pulses having repetition rate equivalent to one pulse per each 1.5 mils of web feed irrespective of web velocity. Thus, the signals on the line 106 provide an especially accurate digitalized measurement of the distance of registration error in the print-to-cutoff distance.

A digitalized pulse output counter 108 is coupled to receive all of the pulses from the conductor 106 and operates in the binary mode the same as the decade counter 68 and 70. This counter has a reset input responsively coupled to the signals on conductor 90 from the pre-amplifier 56. A buffer memory 110 directly receives each of the binary outputs from the output counter 108 and temporarily stores them in raw binary from under the control of an inverter 112. During the time that the output from error duration gate 96 is low and the digitalized output pulses are flowing to and from the output counter 108, the inverter 112 is feeding a high signal to the buffer memory to enable it. As soon as the gate 96 returns high, the inverter passes a complement signal to each of the then set storing sections of the buffer memory. Thus, the buffer memory retains the complement or "not" value of the increments of the digitalized output which it held at the completion of the counting of the error pulses. This is logically noted by the use of $\bar{1}$, $\bar{2}$, $\bar{4}$ and $\bar{8}$ as the outputs from the memory block 110 in FIG. 3.

A converter 114 is responsively coupled to the outputs of the buffer memory 110 as well as the error direction output from the bistable device 98 and converts these signals into a precise digitalized sum of current of proper polarity which is applied to the meter 48. The precise amount of applied current deflects the meter a 1.5 mil-inch division for each digitalized pulse fed into the output counter 108 and in either the long L or short S direction depending upon the logic response to the physical condition.

A gate 116 is coupled to the 1 and 8 output leads of the output counter 108. A third input to this gate is via the conductor 62 from the encoder's pre-amplifier 54. The output from the gate 116 is coupled to the reset input of a bistable device 118, which has its set input connected to the conductor 90 to receive the zero reference pulse at the start of each measuring cycle. This periodic setting of the device 118 drives its output line 104 low for the duration of the measuring cycle and thus holds low one input of gate 102, as previously discussed. If the error count reaches nine, the output of gate 116 goes high, resets the bistable device 118 and blocks the flow of pulses thru gate 102, via the input conductor 104, until the next "set" pulse, via conductor 90, from the zero reference generator.

Inasmuch as the description of the circuitry of FIG. 3 also detailed its operation, there only remains to be provided an explanation of the initial setup of the system, which is substantially as illustrated in FIGS. 1 and 2. As shown, the web 10 is threaded through the loop adjustor 12, the scanner 14, and the cutting cylinders 16. The distance between the scanner and the cutting cylinders is relatively close, but need not be less than the length of the workpiece, the data card. The scanner is secured such that its scanning track 36 encompasses a single row of the data pads.

The web is then advanced so that the measuring pad 38 is approximately 75 mils prior to the scanner area 34. This is not a critical setting. (This is not shown in FIG. 2.) Next, the switches 44 and 46 are preset to 50. This will cause the units counter 68 and the tens counter 70 to be automatically preset to 50 prior to the beginning of each measuring cycle. Since the total measuring cycle terminates upon the 100th encoder pulse, presetting at 50 leaves a remainder of 50 encoder pulses, which are to be fed through the circuitry while the web advances 75 mil-inches—the same distance that the first pad lies in advance of the scanner area. The next setup step is the manual adjustment of the zero pulse generating portion of the cylinder position monitor 18 so that the zero reference position pulse would be generated at that position of the cylinders 16.

The last pre-operational step is dynamic adjustment of the true size of the controlled distance B, which is accomplished during running of the printing press. If the measuring pad to scanning area distance were set at exactly 75 mils and the zero reference pulse generator were exactly in the correct position, then the meter 48 would not show any misalignment error. However, a perfect setup is not practical and certainly not necessary. With the presses running, the loop adjustor 12 is adjusted until, by visual inspection, the print-to-cutoff distance is correct. If then the meter reports misalignment error, the switches 44 and 46 are to be manipulated until the meter centers. If there is considerable misalignment error, the cylinder position monitor can be readjusted for gross correction and then the counter preset switches employed for the fine adjustment.

Once the meter is centered to indicate absence of setup alignment error, the system is operational and the switches 44 and 46 are not to be manipulated. Any subsequent meter fluctuations are in response to print-to-cutoff registration errors and are to be corrected by the loop adjustor 12 or its equivalent which can be manually controlled, as previously described, or can be regulated by an output from the computer 20 in much the same way as the regulation of the current into the meter 48.

If the pre-operational correction for alignment error caused the switches 44 and 46 to be set at the value 60, then the first pulse into the counters 68 and 70 would be registered as the 61st encoder pulse. Hence, the 40th pulse subsequent to the enabling of the gate 66 by the zero reference source 52 would be the 100th pulse, which terminates the measurement of the fixed, controlled distance B. The passage of the 100th pulse resets the bistable device 86. The passage of the measuring pad 38 causes the scanner 14 to generate a signal which resets the bistable device 88. The relative "time" difference in the occurrence of these two resetting signals is then converted into digitalized pulses, counted, and stored. Which resetting signal first occurred is also logically deduced and then reduced to a polarity output signal. The stored digitalized value and its polarity are finally converted into a current signal which drives the meter 48.

From the foregoing it will be seen that a simple highly efficient and economic digitalized print-to-cutoff registration system has been provided for accomplishing all the initially listed and additional objects and advantages of this invention. While there have been shown and described the fundamental novel features of this registration system as applied to a preferred embodiment for use in a particular environment, it will be apparent to those skilled in the art that variations may be made therein without departing from the spirit of the invention.

What it is desired to secure by letters patent of the United States is:

1. A digitalized system for measuring the distance between two points on a moving media and providing a directly calibrated reading of the relationship between said measured distance and a preset distance, the start of said measured and preset distances coinciding with one of said points and the end of said measured distance coinciding with the other of said points comprising:

incrementally calibrated output means bidirectionally responsive to the relationship between the end positions of said measured and preset distances, a source of incrementally encoded pulses having a repetition rate proportionately related to the increments of calibration of said output means such that each encoded pulse is equivalent to a precise distance of movement of said media, means for counting a preset number of said encoded pulses, the duration of said preset number being equivalent to the movement of said media a distance equal to said preset distance, and for providing a characteristic signal upon the attainment of said preset number, said signal arising at the end of said preset distance, means for detecting the passage of said second point past a predetermined location, and providing a characteristic signal in response thereto, means for receiving both said characteristic signals, ascertaining which was first provided, and designating the elapsed duration between their receipt, means coupled to said receiving means for deriving in said elapsed duration a train of pulses of the same repetition rate as said encoded pulses, means coupled to said receiving means for deriving a response having a polarity indicative of which of said characteristic signals was first received, and output conversion means coupled to be responsive to said derived train of pulses and said indicative polarity response and for applying to said output means an energization of the same polarity and of a magnitude directly related to the number of pulses in said train of pulses and thereby incrementally related to the distance between the end of said preset distance and said second point, an absence of said train of pulses indicating coincidence of said second point and end of said preset distance and designating a correct distance between said two points.

2. The system as defined in claim 1 in which said means for counting a preset number of said encoded pulses comprises:

input gating means coupled to receive each said encoded pulse, pulse counting circuitry coupled to the output of said gate for recoding the total number of gated pulses, and electronic logic connected to outputs of said counting circuitry for responding to pulse counts less than said preset number.

3. The system as defined in claim 2 further comprising:

output gating means connected to said logic such that said characteristic signal provided upon the attainment of said preset number is derived from said logic and is elicited from said output gating means, and automatically resettable counting circuitry presetting means coupled between said counting circuitry and the output from said output gating means for resetting said counting circuitry to a predetermined starting value upon the attainment of said preset number.

4. The system as defined in claim 3 further comprising switching means coupled between said output gating means and said input gating means for disabling said input gating means subsequent to the attainment of said preset number of encoded pulses.

5. The system as defined in claim 4 further comprising:

a reference pulse generator coupled to said switching means for enabling said input gating means to commence the gating of said preset number of encoded pulses, said reference pulse generator also being coupled to said receiving means for exerting control thereupon.

6. The system as defined in claim 5 further comprising:

pulse generation drive means operatively responsive to the linear passage of said moving media, said drive means driving both said source of encoded pulses and said reference pulse generator so as to be synchronized with each other and the linear passage of said media.

7. The system as defined in claim 6 further comprising:

media cutting means operative to sever the media into linear members of regular length, said cutting means being linked in driving relation to said pulse generation drive means such that said measured and preset distances are short relative to the distance between said second point and a point of severing said media, the ultimate purpose of said digitalized system being the monitoring of the distance between said point of severing and said second point.

8. The system as defined in claim 1 in which said detecting means contains optical means for scanning a small portion of said media and being responsive to the light transmitting characteristics of said media at said second point and just prior thereto.

9. The system as defined in claim 1 in which said receiving means comprises:
a pair of switching elements each coupled to receive a different one of said characteristic signals, and
a pair of coincidence gates each gate having inputs connected to each of said switching elements.

10. The system as defined in claim 9 in which
said switching elements each possess a pair of outputs of opposite polarity, and
each coincidence gate is connected to one output of different polarity from each switching element such that any time difference in the receipt of said characteristic signals causes the same time difference in the enabling of said coincidence gates.

11. The system as defined in claim 10 in which said polarity indicative means comprises
a bistable switch having an input coupled to the output of each of said coincidence gates and having an output providing said polarity indicative response controlled by which of said coincidence gates is first enabled by said pair of switching elements.

12. The system as defined in claim 1 in which said output conversion means comprises:
an output pulse train counter for counting the number of pulses in said train, and
an energy converter coupled to receive numeric representative outputs from said pulse train counter and convert them into a signal of related magnitude.

13. The system as defined in claim 12 in which said output conversion means further comprises
a buffer memory coupled between said output pulse train counter and said energy converter.

14. A digitalized input-output system for monitoring the relative distance between two points on a linearly moving media by measuring the distance between a second of said points and a third point, the measured distance being significantly less than the monitored relative distance, comprising:
pulse train generating and counting means enabled for a selected number of pulses representative of a proper registration distance between said third and second points, detecting means for responding to the passage of said second point past a fixed location,
comparing means responsive both to the end of said selected number of pulses and the passage of said second point and having outputs represented as a group of pulses and a reference level,
conversion means coupled to said outputs for storing the number of pulses in said group and converting said stored number into a related signal magnitude having a polarity responsive to said reference level, and
an output recorder coupled to said conversion means for dynamically recording said signal magnitude and polarity.

15. The system as defined in claim 14 in which the monitored distance is the print-to-cutoff distance between a first cutoff point and a second print point and further comprising:
media cutting means continuously operative to periodically sever said media into predetermined lengths,
said cutting means controllingly coupled to a pair of inputs of said pulse train generating and counting means for regulating the number of pulses in the train and the number counted.

16. The system as defined in claim 15 in which said output recorder comprises:
a bidirectional meter scaled to be directly responsive to each of said pulses in said group, which in turn are a direct measure of the distance differences between said proper registration distance and said measured distance.

References Cited

UNITED STATES PATENTS

| | | | |
|---|---|---|---|
| 3,048,751 | 8/1962 | Taylor | 83—76 X |
| 3,276,647 | 10/1966 | Lewis et al. | 83—74 X |

JAMES M. MEISTER, Primary Examiner

U.S. Cl. X.R.

226—29; 340—259

PO-1050
(5/69)

UNITED STATES PATENT OFFICE
CERTIFICATE OF CORRECTION

Patent No. 3,468,201 Dated September 23, 1969

Inventor(s) Robert G. Adamson & Paul W. Thiede

It is certified that error appears in the above-identified patent and that said Letters Patent are hereby corrected as shown below:

In the specification, column 3, line 23, "+ .002 inches" should read --± .002 inches--; line 24, "0.75 inch" should read --.075 inches--. Column 5, line 15, "it" should be changed to read --its--; line 75, "from" should read --form--.

In the claims, column 8, line 22, "recoding" should read --recording--; column 9, line 15, "claim 10" should read --claim 1--.

SIGNED AND SEALED
JUN 9 1970

(SEAL)
Attest:

Edward M. Fletcher, Jr.
Attesting Officer

WILLIAM E. SCHUYLER, JR
Commissioner of Patents